United States Patent [19]

Watson

[11] 4,288,986

[45] Sep. 15, 1981

[54] WAVE POWERED GENERATOR

[76] Inventor: James G. O. Watson, 11 Culross Rd., Bryanston, Sandton, Transvaal, South Africa

[21] Appl. No.: 103,717

[22] Filed: Dec. 14, 1979

[30] Foreign Application Priority Data

Dec. 21, 1978 [ZA] South Africa ............. 78/7192

[51] Int. Cl.³ ............................................. E02B 9/08
[52] U.S. Cl. ........................................ 60/501; 60/497; 60/505; 290/53
[58] Field of Search ............. 60/497, 501, 505, 506, 60/495, 499; 417/330, 331, 333; 290/42, 53

[56] References Cited

U.S. PATENT DOCUMENTS 1,044,913 11/1912 Rhodes .............................. 60/506
1,471,222 10/1923 Taylor ........................... 60/506 X
3,928,967 12/1975 Salter ............................. 60/495 X Primary Examiner—Allen M. Ostrager
Assistant Examiner—Stephen F. Husar

[57] ABSTRACT

This invention relates to a method of and device for generating energy from waves in water. The device includes a cylindrical buoyant body which has a regular shape in cross-section and annular tracks on its end faces. Gears adapted to constrain the body for rotation about its axis in one direction only are engaged in axial alignment with the tracks on one side of the center of gravity of the body and movable and rotatable means such as a cam or the like is engaged with the track on the opposite side of the center of gravity of the body to inhibit buoyant upward movement of the body on that side of its center of gravity and encourage rotary movement of the other side of the body relatively to the constraining gears.

11 Claims, 6 Drawing Figures

WAVE POWERED GENERATOR

FIELD OF THE INVENTION

This invention relates to a device for converting the energy of waves in water, and particularly ocean waves, into a useful form of energy such as electrical energy.

BACKGROUND TO THE INVENTION

In many wave powered generators known to the applicant an attempt is made to convert the energy in water waves into a useful form of energy by means of a substantially linearly reciprocating mechanism from which the linear motion must again be converted into rotary motion to be useful. It is, with all of the known converters of this type, in which the buoyant bodies of the devices are caused to oscillate with a linear or rolling reciprocating motion, inevitable that there must be certain energy losses due to the use of reciprocating mechanisms and motions inherent in such devices.

OBJECT OF THE INVENTION

It is an object of this invention to provide a wave powered generator which will directly convert the oscillating motion of water waves into a rotational motion.

SUMMARY OF THE INVENTION

A method of generating energy from waves according to the invention consists in supporting a buoyant body in water, causing the body alternately to rise and fall under the influence of waves in the water while constraining it to one side of its centre of gravity for rotary movement in one direction only and employing the rotary movement of the body to operate an energy converter.

Preferably, the method includes the step of inhibiting the body on the opposite side of its centre of gravity to that on which it is constrained for rotary motion against rising under the influence of a wave so that the body will in effect be more buoyant on the side on which it is constrained for rotary motion than on the other side.

A device for generating energy from waves in water according to the invention includes a buoyant body, means engaged with the body at a position displaced from its centre of gravity for constraining the body for rotation about an axis in one direction only and means for coupling the body to an energy converter.

In one form of the invention the device includes means which are engaged with the body during rotation to guide the rotational movement of the body.

BRIEF DESCRIPTION OF THE DRAWINGS

An embodiment of the invention will now be described by way of example with reference to the drawings in which.

DETAILED DESCRIPTION OF THE DRAWINGS

Figure 1:
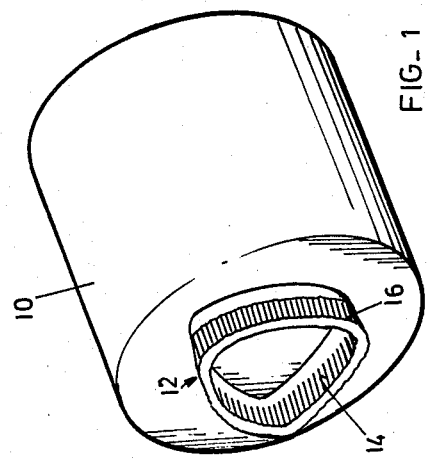
FIG. 1 is a perspective view of the rotational body of the converter of the invention.

The essential component of the generator of the invention is shown in FIG. 1 to consist of a cylindrical body 10 which carries an annular track member 12 on each of its end faces. The body 10 is hollow and made from any suitable material or alternatively is solid and made from a buoyant light weight material.

The track members 12 are trilobate in end elevation as is more clearly seen in FIGS. 3 to 6 and carry geared tracks 14 and 16 on their inner and outer surfaces respectively. The tracks are fixed concentrically in axial register to the body 10.

Figure 2:
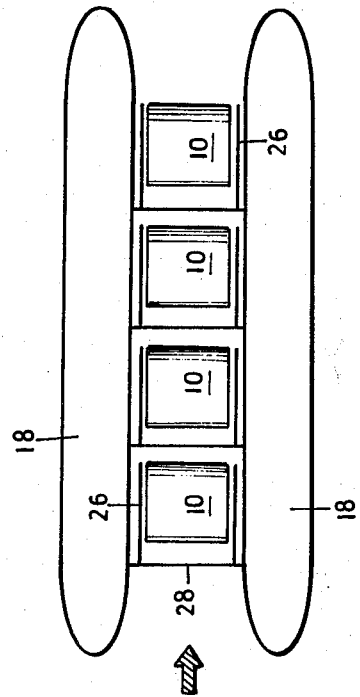
FIG. 2 is a diagrammatic plan view of four of the FIG. 1 bodies located for rotation between two joined and floating hulls.

In practice one or more bodies 10, as seen in FIG. 2, are located between two floating hulls 18 which are joined to each other and held in the spaced parallel relationship shown in the drawing to form a composite vessel.

The vessel provides automatic compensation for tidal variations and its mass and buoyancy are such that it is substantially unaffected by design waves and is responsive only to wave amplitudes in excess of the design wave heights.

The bodies 10 are mounted for rotation in structures between the hulls 18. The structures each carry rotatable geared members 20, 22 and 24 which are engaged as illustrated in FIGS. 3 to 6 with the geared tracks on the track members 12.

The shafts on which the geared members 20 and 22 are rotatable are located for rotation in fixed positions on the mounting structure and one or the other or both on each side of the body could be located on a shaft which is adapted to drive through a suitable coupling, an energy converter such as an electrical generator on the vessels 18. The gears 20 and 22 are adapted by any suitable means to permit rotation of the bodies 10 in only one direction, which, in FIGS. 3 to 6 is the direction of the arrow.

The geared members 24, in this embodiment of the invention, are adapted for vertical movement on the mounting structure in both directions and are biased downwardly into engagement with the geared track 16. The geared members 24 are preferably located on the incident wave side of the bodies 10.

To cater for excessive and unpredictable wave motions the mounting structure that holds each of the bodies 10 between the hulls 18 could consist of a member 26 which carries the gears on each side of the bodies 10 with the forward or incident ends of the members being connected to a cross member 28 which is pivotally connected between the hulls 18. Each of the mounting structures is baised by suitable means in a clockwise direction to minimise vertical movement of the structure during normal operation of the device in waves of design height. The bias force acting on the structures is, however, such that the buoyant upward force on the bodies 10 in excessive waves will overcome the bias to lift the bodies and supporting structure and so limit the destructive wave forces which would otherwise be imposed on them.

In use, the vessel composed of the two hulls 18 is anchored at a suitable site with the bows of the hulls directed normally to the principal incident wave direction, as indicated by the arrow in FIG. 2. The buoyancy of each vessel is then so adjusted that the bodies 10 are situated at mean water level.

The rotation of a single body 10 will now be explained with reference to FIGS. 3 to 6. The body 10 has essentially two phases of operation which produce the desired rotational motion. The first is a buoyancy phase and the second is a gravity phase. These phases of operation are principally induced by the potential energy of the waves with the buoyancy phase being assisted by wave kinetic energy. For practical purposes the axes of the geared members 20 and 22 are fixed in space due to the buoyancy differential between the body 10 and the vessels 18, and serve as reference points of rotation for the track member 12. The geared member 24 inhibits vertical movement of the incident side of the body with which it is engaged during the buoyancy phase of operation and so induces greater vertical movement of the body on the side of the body on which the geared members 20 and 22 are located.

Figure 3:
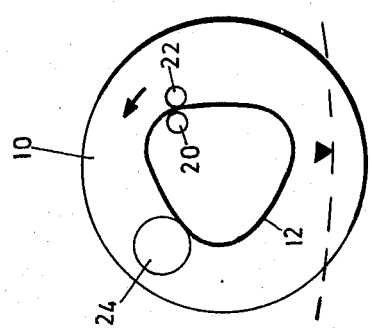

When the body 10 is in a design wave trough, as illustrated by the dotted line in FIG. 3, it is at its lowest vertical point of operation with its centres of buoyancy and gravity instantaneously in vertical register.

Figure 5:
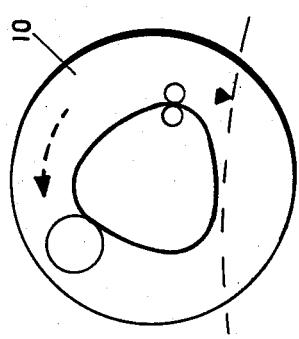
Figure 4:
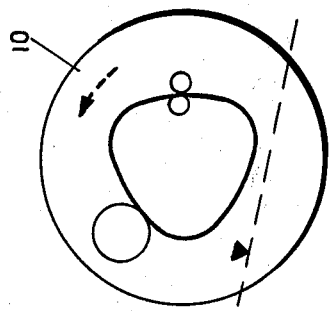

As the following wave crest rides from left to right onto the body, as illustrated in FIG. 4, upward buoyant movement of the left hand side of the body is restrained by the downward bias of the geared member 24. When the centre of buoyancy moves to the right with the wave crest across the centre of gravity of the body, which because in this embodiment the body 10 is cylindrical, always lies on its axis, the right hand side of the body will lift with a rotational movement about the geared member 24 with the track member 12 passing between the geared members 20 and 22 as illustrated in FIGS. 4 and 5. The body is restrained against kinetic energy transport to the right in the drawings by the fixed geared members 20 and 22. This is the buoyancy phase of operation of the device.

Figure 6:
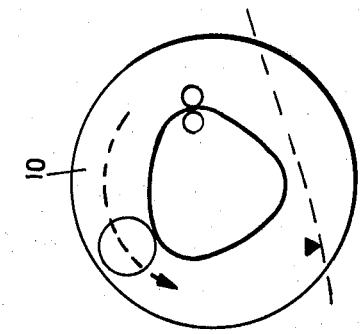
FIGS. 3 to 6 are schematic end elevations of the body of FIG. 1 which illustrate various degrees of rotation of the body in use.

In FIG. 5 the body is at the top of its cycle with its centres of buoyancy and gravity against instantaneously in vertical register. As the wave crest recedes, as illustrated in FIG. 6, the gravity phase of the device commences. With the commencement of the gravity phase the centre of buoyancy moves to the right, away from the line of action of the centre of gravity so tending to hold the right hand side of the body elevated. The gears 20 and 22 in any event accomplish this by constraining the track against downward movement between them. With little or no buoyancy now supporting the left hand side of the body it will fall and rotate about the gear 20 under the influence of gravity from the FIG. 5 position through the FIG. 6 position and back to the FIG. 3 position about the geared member 20. In this fashion the body 10 will be caused by wave motion to rotate and the track member 12 to pass between the gears 20 and 22.

Thus far, little mention has been made of the effect of the kinetic energy of the waves on the body 10 during rotation and to take advantage of the kinetic energy particularly during the buoyancy phase, the curved surface of the body 10 could include suitable formations or radially projecting fins which when acted on by the kinetic energy will assist the rotation of the body.

The invention is not limited to the precise constructional details as herein described and the body 10 and track member could be of any regular shape. For example, the body could in end elevation be trilobate as is the track member in the illustrated embodiment. Additionally, the geared members 20, 22 and 24 could and in practice would probably need to be eccentric cams.

Additional cams or geared members could be engaged with the track members to hold the body 10 within its variable parameters of rotation, particularly in high amplitude waves where during the buoyancy phase the upward forces on the bodies 10 are excessive and in the lower portion of the gravity phase where the bodies may be falling under gravity clear of the water.

In a second embodiment of the invention the rotational movement of the bodies 10 could be guided by rollers which are mounted on the free ends of levers which are pivotally attached to the mounting structure and suitably biased into engagement with the bodies 10.

I claim:

1. A method of generating energy from waves in water consisting of supporting a buoyant body in water, causing the body alternately to rise and fall under the influence of waves in the water while constraining it to one side of its centre of gravity for rotary movement in one direction only and employing the rotary movement of the body to operate an energy converter.

2. A method as claimed in claim 1 including the step of inhibiting the body on the opposite side of its centre of gravity to that on which it is constrained for rotary motion against rising under the influence of a wave so that the body will in effect be more buoyant on the side on which it is constrained for rotary motion than on the other side.

3. A device for generating energy from waves in water including a buoyant body, means engaged with the body at a position displaced from its centre of gravity for constraining the body for rotation about an axis only in one direction when the body is subject to the influence of the waves and means for coupling the body to an energy converter.

4. A device as claimed in claim 3 including structure in which in use the body is located for rotation with its axis of rotation substantially parallel to the surface of the water.

5. A device as claimed in claim 4 in which the body has a regular shape in end elevation with parallel end faces and includes an endless track on each end face with the constraining means being means on the structure engaged with each track in axial alignment.

6. A device as claimed in claim 5 in which the tracks each consist of an annular member which projects outwardly from an end face of the body with geared tracks on the radially inner and outer surfaces of the member; the track engaging means being a pair of gears which are engaged with and on opposite sides of the geared tracks on the annular member with means connected to the gears adapted to permit movement of the track between the gears in one direction only.

7. A device as claimed in claim 4 including at least one rotatable member on the structure which is engaged with the body on the opposite side of its centre of gravity to that on which the constraining means are located to inhibit upward movement of that side of the body in use.

8. A device as claimed in claim 6 in which a cam having a geared periphery is engaged with each track on the opposite side of the centre of gravity of the body to that on which the constraining gears are located to guide the body during rotation and to inhibit upward movement of that side of the body in use.

9. A device as claimed in claim 4 in which the structure in which the body is located is buoyant and includes means for raising or lowering the body relatively to the mean water level in use.

10. A device as claimed in claim 9 in which the buoyant structure is two buoyant hulls which are held in a spaced relationship and between which the body and its engaging means is supported on means which is pivotally attached to the hulls so that the body is movable relatively to the hulls by excessive wave motions.

11. A device as claimed in claim 5 in which the body is cylindrical in shape and the tracks are lobate anuli.

* * * * *